(12) United States Patent
Eo et al.

(10) Patent No.: US 10,086,820 B2
(45) Date of Patent: Oct. 2, 2018

(54) NON-UNIFORM DISPLACEMENT ENGINE CONTROL SYSTEM AND METHOD HAVING TRANSIENT STATE CONTROL MODE

(71) Applicant: HYUNDAI MOTOR COMPANY, Seoul (KR)

(72) Inventors: Jeong Soo Eo, Hwaseong-si (KR); Yeon Bok Kim, Seongnam-si (KR); Youn Kwang Jung, Suwon-si (KR); Sung Jae Kim, Suwon-si (KR); Young Joon Chang, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 127 days.

(21) Appl. No.: 15/264,998

(22) Filed: Sep. 14, 2016

(65) Prior Publication Data
US 2017/0080917 A1    Mar. 23, 2017

(30) Foreign Application Priority Data

Sep. 17, 2015 (KR) .................. 10-2015-0131356
Jun. 8, 2016 (KR) .................. 10-2016-0071040

(51) Int. Cl.
*B60W 20/15* (2016.01)
*B60W 20/17* (2016.01)
(Continued)

(52) U.S. Cl.
CPC ............ *B60W 20/10* (2013.01); *B60W 10/06* (2013.01); *B60W 10/08* (2013.01);
(Continued)

(58) Field of Classification Search
CPC ...... B60W 20/10; B60W 10/06; B60W 10/08; B60W 30/18127; B60W 2710/0672;
(Continued)

(56) References Cited

U.S. PATENT DOCUMENTS 4,411,230 A   10/1983   Lee
5,374,224 A   12/1994   Huffmaster et al.
(Continued)

FOREIGN PATENT DOCUMENTS

JP    07-208222 A    8/1995
JP    07-229754 A    8/1995
(Continued)

OTHER PUBLICATIONS

U.S. Final Office Action issued in U.S. Appl. No. 14/954,450, dated Jul. 3, 2017.
(Continued)

*Primary Examiner* — Yazan A Soofi
(74) *Attorney, Agent, or Firm* — McDermott Will & Emery LLP

(57) ABSTRACT

A non-uniform displacement engine control system having a transient state control mode includes a non-uniform displacement engine including a plurality of cylinders, the cylinders including at least two sizes of cylinders having different displacements, a motor connected to a driving shaft of the engine, a battery for supplying electrical energy to the motor, and a motor control unit for controlling the motor, wherein the motor control unit controls the motor such that a sum of engine torque and motor torque in explosion strokes of each cylinder is uniform by compensating for a difference in torque caused by the cylinders having different displacements, and the motor control unit has a transient state control mode for additionally applying offset torque to predetermined motor torque at a time of rapid acceleration or rapid deceleration.

17 Claims, 9 Drawing Sheets

(51) Int. Cl.
  *B60W 10/06* (2006.01)
  *B60W 10/08* (2006.01)
  *B60W 30/18* (2012.01)
  *B60W 30/20* (2006.01)
  *B60W 20/10* (2016.01)
  *F02D 41/00* (2006.01)
  *F02B 75/18* (2006.01)
  *F02D 41/04* (2006.01)
  *F02B 75/02* (2006.01)
  *F02D 29/02* (2006.01)

(52) U.S. Cl.
  CPC ....... *B60W 30/18127* (2013.01); *F02B 75/18* (2013.01); *F02D 41/008* (2013.01); *B60W 2710/0672* (2013.01); *B60W 2710/085* (2013.01); *B60W 2720/106* (2013.01); *F02B 75/02* (2013.01); *F02D 29/02* (2013.01); *F02D 41/045* (2013.01); *F02D 2200/602* (2013.01); *Y10S 903/93* (2013.01)

(58) Field of Classification Search
  CPC ....... B60W 2710/085; B60W 2720/106; F02B 75/18; F02B 75/02; F02B 29/02; F02D 41/008; F02D 41/045; F02D 2200/602; Y10S 903/93
  USPC .......................................................... 701/22
  See application file for complete search history.

(56) References Cited

U.S. PATENT DOCUMENTS

| | | | |
|---|---|---|---|
| 5,437,253 A | 8/1995 | Huffmaster et al. | |
| 5,722,359 A * | 3/1998 | Chubachi ............... | B60K 6/485 123/192.2 |
| 7,240,749 B2 | 7/2007 | Bhavsar et al. | |
| 9,440,640 B1 | 9/2016 | Pritchard et al. | |
| 2002/0116099 A1 * | 8/2002 | Tabata ..................... | B60K 6/32 701/22 |
| 2004/0012206 A1 | 1/2004 | Wakashiro et al. | |
| 2005/0011690 A1 | 1/2005 | Bhavsar et al. | |
| 2005/0164826 A1 | 7/2005 | Albertson | |
| 2006/0032684 A1 | 2/2006 | Rayl | |
| 2006/0196463 A1 | 9/2006 | Pallett et al. | |
| 2007/0078586 A1 | 4/2007 | Pallett et al. | |
| 2007/0131183 A1 * | 6/2007 | Shei ........................ | F02B 73/00 123/48 R |
| 2009/0259380 A1 | 10/2009 | Picron et al. | |
| 2010/0042279 A1 | 2/2010 | Thompson et al. | |
| 2011/0115439 A1 | 5/2011 | Kim | |
| 2013/0096759 A1 * | 4/2013 | Breton ................... | B60W 20/10 701/22 |
| 2013/0255639 A1 * | 10/2013 | Guillen Castillo ... | B60W 10/08 123/472 |
| 2013/0276755 A1 | 10/2013 | Springer et al. | |
| 2015/0203105 A1 * | 7/2015 | Liang ..................... | B60L 15/20 701/22 |
| 2015/0314773 A1 | 11/2015 | Zhou et al. | |

FOREIGN PATENT DOCUMENTS

| | | |
|---|---|---|
| JP | 08-312393 A | 11/1996 |
| JP | 2002-013423 A | 1/2002 |
| JP | 2002276416 A | 9/2002 |
| JP | 2004-052573 A | 2/2004 |
| JP | 2004108342 A | 4/2004 |
| JP | 2007-069860 A | 3/2007 |
| JP | 2007-162672 A | 6/2007 |
| JP | 2010-247830 A | 11/2010 |
| JP | 2011-051383 A | 3/2011 |
| JP | 2015-101959 A | 6/2015 |
| KR | 1997-0044043 A | 7/1997 |
| KR | 10-2006-0069095 A | 6/2006 |
| KR | 10-2011-0054135 A | 5/2011 |
| KR | 10-1091664 B1 | 12/2011 |
| KR | 10-2013-0106482 A | 9/2013 |
| KR | 10-2014-0059680 A | 5/2014 |

OTHER PUBLICATIONS

Non-Final Office Action issued in related U.S. Appl. No. 15/266,680, dated Nov. 21, 2017.
Non-Final Office Action issued in related U.S. Appl. No. 15/266,622, dated Feb. 9, 2018.
Extended European Search Report dated Jan. 26, 2017, issued in European Application No. 15197480.5.
Non-Final Office Action dated Jan. 17, 2017, issued in U.S. Appl. No. 14/954,450.
Non-Final Office Action issued in U.S. Appl. No. 14/954,450, dated Jan. 11, 2018.
Non-Final Office Action issued in U.S. Appl. No. 15/264,812, dated Apr. 2, 2018.
Notice of Allowance issued in U.S. Appl. No. 15/266,680, dated Apr. 4, 2018.

* cited by examiner

NON-UNIFORM DISPLACEMENT ENGINE CONTROL SYSTEM AND METHOD HAVING TRANSIENT STATE CONTROL MODE

CROSS-REFERENCE TO RELATED APPLICATION

This application claims under 35 U.S.C. § 119(a) the benefit of priority to Korean Patent Application Nos. 10-2015-0131356 and 10-2016-0071040, filed on Sep. 17, 2015 and Jun. 8, 2016 with the Korean Intellectual Property Office, respectively, the entire contents of which are incorporated herein by reference.

TECHNICAL FIELD

The present disclosure relates to a non-uniform displacement engine control system and method having a transient state control mode. More particularly, the present disclosure relates to a system and method for controlling an engine and a motor of a vehicle, wherein the engine includes cylinders having different displacements and the motor supplements the driving force of the engine.

BACKGROUND

A conventional internal combustion engine is configured such that cylinders have uniform displacements in order to satisfy the distribution characteristics required by intake and exhaust systems. The uniform displacement engine has an advantage in that it is possible to easily control the air-to-fuel ratio and exhaust gas. However, the uniform displacement engine has a disadvantage in that the margin for operation point control is insufficient due to the fixed displacement thereof. As a result, it is difficult to satisfy both operational efficiency and fuel efficiency within a specific operation zone, and therefore problems must be addressed by compromising one or both of operational efficiency and fuel efficiency.

In addition, in the engine having fixed displacement cylinders, excessive mechanical energy is consumed in order to secure stable idling, which is inefficient. In particular, operation point control is inevitably and frequently inefficient due to the limitations imposed by vibration and noise.

Such problems, which frequently occur over the entire operation zone of the conventional internal combustion engine, may be solved by striking a tradeoff between operational efficiency, fuel efficiency and emissions.

Meanwhile, Japanese Patent Laid-Open Publication No. 2007-162672 discloses a cylinder arrangement structure of a multi-stage type displacement adjustable engine in which cylinders having different displacements are arranged such that the displacement of the engine is adjusted in multiple stages based on operational combinations of the cylinders.

The cylinder arrangement structure of the multi-stage type displacement adjustable engine disclosed in Japanese Patent Laid-Open Publication No. 2007-162672 has effects in that the displacement of the engine is adjusted in multiple stages, and therefore it is possible to control the operation of the engine in respective operation zones, thereby simultaneously improving operational efficiency and fuel efficiency, but has problems in that vibration and noise are generated due to imbalance in displacement among the cylinders, making it difficult to apply the cylinder arrangement structure of the multi-stage type displacement adjustable engine to vehicles that are actually mass-produced.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to solve the above-described problems associated with the prior art, and it is an object of the present disclosure to provide a non-uniform displacement engine control system and method that are capable of reducing vibration and noise generated by a non-uniform displacement engine including cylinders having different displacements and of securing various levels of power performance based on driving conditions through the cooperation of the engine and a motor.

It is another object of the present disclosure to additionally provide a transient state mode that is applied to a transient state at the time of rapid acceleration or rapid deceleration of a vehicle, thereby securing excellent power performance, maximizing energy efficiency, and providing a satisfactory travel experience to a driver.

In one aspect, the present disclosure provides a non-uniform displacement engine control system having a transient state control mode including a non-uniform displacement engine including a plurality of cylinders, the cylinders including at least two kinds of cylinders having different displacements, a motor connected to a driving shaft of the engine, a battery for supplying electrical energy to the motor, and a motor control unit for controlling the motor, wherein the motor control unit controls the motor such that the sum of engine torque and motor torque in explosion stroke of each cylinder is uniform by compensating for the difference in torque caused by the cylinders having different displacements, and the motor control unit has a transient state control mode for additionally applying offset torque to predetermined motor torque at the time of rapid acceleration or rapid deceleration.

In an embodiment, the motor control unit may determine that rapid deceleration has been performed when driver-requested deceleration exceeds a predetermined first deceleration reference value and may determine that rapid acceleration has been performed when driver-requested acceleration exceeds a predetermined first acceleration reference value.

In another embodiment, the motor control unit may determine that rapid deceleration has been performed when actual deceleration of a vehicle exceeds a predetermined first deceleration reference value and may determine that rapid acceleration has been performed when actual acceleration of the vehicle exceeds a predetermined first acceleration reference value.

In still another embodiment, the non-uniform displacement engine may include two kinds of cylinders having different displacements, the motor control unit may have a first mode for controlling the motor such that the motor is not driven in explosion stroke of a high displacement cylinder and power assistance is performed by the motor torque in explosion stroke of a low displacement cylinder, and, upon determining that the rapid acceleration has been performed, the motor control unit may control the motor in the first mode.

In yet another embodiment, the offset torque applied at the time of rapid acceleration may be positive torque.

In still yet another embodiment, the motor control unit may determine whether rapid acceleration has been finished based on requested acceleration information or actual acceleration information and, upon determining that the rapid acceleration has been finished, may control the motor such that the application of the offset torque is released.

In a further embodiment, the non-uniform displacement engine may include two kinds of cylinders having different displacements, the motor control unit may have a second mode for controlling the motor such that energy regeneration is performed in explosion stroke of a high displacement cylinder and such that the motor is not driven in explosion stroke of a low displacement cylinder, and, upon determining that the rapid deceleration has been performed, the motor control unit may control the motor in the second mode.

In another further embodiment, the offset torque applied at the time of rapid deceleration may be negative torque.

In still another further embodiment, the motor control unit may determine whether rapid deceleration has been finished based on requested deceleration information or actual deceleration information and, upon determining that the rapid deceleration has been finished, may control the motor such that the application of the offset torque is released.

In yet another further embodiment, the non-uniform displacement engine may include two sets of cylinders, each set of cylinders comprising two cylinders having the same displacement.

In still yet another further embodiment, the non-uniform displacement engine may be configured such that first and fourth cylinders have higher displacement than second and third cylinders, and each set of cylinders alternately performs an explosion stroke.

In another aspect, the present disclosure provides a control method of a system including a non-uniform displacement engine including a plurality of cylinders, the cylinders including at least two kinds of cylinders having different displacements; a motor connected to a driving shaft of the engine; and a motor control unit for controlling the motor, the control method including (a) driving the non-uniform displacement engine, (b) determining motor torque based on engine torque, and (c) controlling the motor based on the determined motor torque, wherein, at step (b), the motor control unit controls the motor such that the sum of engine torque and motor torque in explosion stroke of each cylinder is uniform by compensating for the difference in torque caused by the cylinders having different displacements, and the motor control unit has a transient state control mode for additionally applying offset torque to predetermined motor torque at the time of rapid acceleration or rapid deceleration.

In an embodiment, the transient state control mode may include a first transient state control mode for additionally applying positive offset torque to predetermined motor torque at the time of rapid acceleration and a second transient state control mode for additionally applying negative offset torque to predetermined motor torque at the time of rapid deceleration.

In another embodiment, the motor control unit may determine that rapid deceleration has been performed when driver-requested deceleration or actual deceleration of a vehicle exceeds a predetermined first deceleration reference value and may determine that rapid acceleration has been performed when driver-requested acceleration or actual acceleration of the vehicle exceeds a predetermined first acceleration reference value.

In still another embodiment, the non-uniform displacement engine may include two kinds of cylinders having different displacements, the motor control unit may have a first mode for controlling the motor such that the motor is not driven in explosion stroke of a high displacement cylinder and power assistance is performed by the motor torque in explosion stroke of a low displacement cylinder, and the step of controlling the motor in the transient state control mode may include determining whether the mode at the time of rapid acceleration is the first mode and, upon determining that the mode at the time of rapid acceleration is not the first mode, performing transition to the first mode before the offset torque is applied.

In yet another embodiment, the non-uniform displacement engine may include two kinds of cylinders having different displacements, the motor control unit may have a second mode for controlling the motor such that energy regeneration is performed in explosion stroke of a high displacement cylinder and the motor is not driven in explosion stroke of a low displacement cylinder, and the step of controlling the motor in the transient state control mode may include determining whether the mode at the time of rapid deceleration is the second mode and, upon determining that the mode at the time of rapid deceleration is not the second mode, performing transition to the second mode before the offset torque is applied.

In still yet another embodiment, the motor control unit determines that rapid deceleration has been finished when driver-requested deceleration or actual deceleration of a vehicle is equal to or less than a predetermined second deceleration reference value and determines that rapid acceleration has been finished when driver-requested acceleration or actual acceleration of the vehicle is equal to or less than a predetermined second acceleration reference value, and, upon determining that the rapid deceleration has been finished or the rapid acceleration has been finished, releases the application of the offset torque.

Other aspects and preferred embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
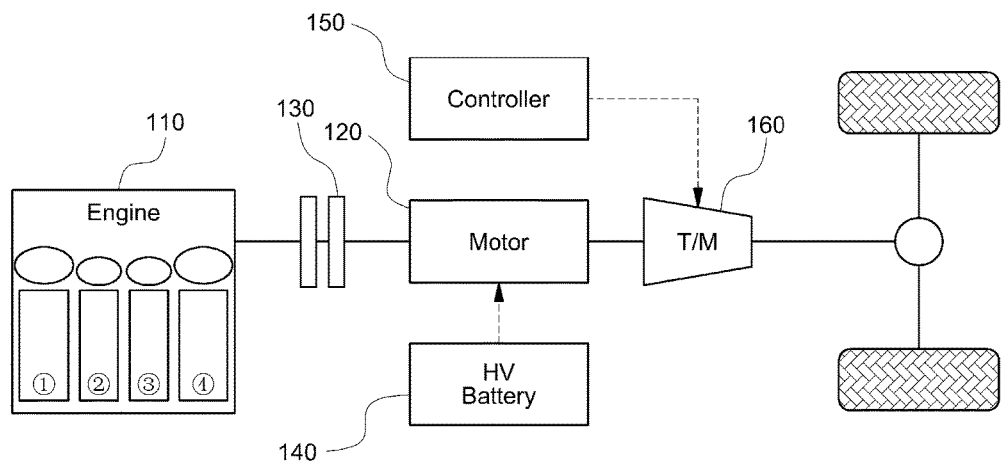
FIG. 1 is a view schematically showing a construction of a non-uniform displacement engine control system according to embodiments of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the disclosure will be described in conjunction with exemplary embodiments, it will be understood that the present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

The present disclosure proposes a new-concept non-uniform displacement engine control system that performs control using a motor in a system including a non-uniform displacement engine including cylinders having different displacements, thereby achieving different displacements based on driving conditions, and a method for the same. In particular, the present disclosure has another characteristic in that a system depending upon the conventional inefficient use of mechanical energy is configured to utilize electrical energy, which is more efficient, thereby improving overall system efficiency.

In addition, the present disclosure has another characteristic in that a charge intention mode or a discharge intention mode is selectively used based on a state of charge (SOC) of a battery, whereby it is possible to maintain the state of charge of the battery to be uniform by variably controlling the charge amount or the discharge amount based on the current state of the battery.

The present disclosure may be configured such that high displacement cylinders and low displacement cylinders are arranged to execute a high displacement mode and a low displacement mode based on driving conditions, thereby improving fuel efficiency and power performance using the increase in potential energy and kinetic energy of high displacement. In addition, the proportion of a vibration/noise generation area that can be controlled by the motor is increased, thereby achieving a more advantageous driving benefit and experience.

In an embodiment of the present disclosure, the non-uniform displacement engine has a four-cylinder structure including two cylinders of one kind (or size) having the same displacement as each other and two cylinders of the other kind (or size) having the same displacement as each other. However, the present disclosure is not limited thereto, and it should be noted that extensions and modifications are possible so long as the technical spirit of the present disclosure is not changed.

Hereinafter, a motor-assisted non-uniform displacement engine control system according to an embodiment of the present disclosure and a method for controlling a motor-assisted non-uniform displacement engine control system according to an embodiment of the present disclosure will be described in detail with reference to the accompanying drawings.

FIG. 1 is a view schematically showing a construction of a motor-assisted non-uniform displacement engine control system according to embodiments of the present disclosure.

As shown in FIG. 1, the system may include an engine 110 and a motor 120 as driving sources that provide driving torque necessary to propel a vehicle.

Driving shafts of the engine and the motor may be connected to each other via a power switching unit 130, such as a clutch. However, the present disclosure is not limited thereto. The driving shafts of the engine 110 and the motor 120 may be directly connected to each other. In addition, the system may include a battery 140 for supplying electrical energy to the motor 120 and a motor control unit 150 for controlling the operation of the motor.

In the present disclosure, the battery is used as an electrical energy supply means. However, the present disclosure is not limited thereto as long as the electrical energy supply means can supply the electrical energy necessary to drive the motor 120 while storing the electrical energy.

In addition, although not shown, the system may include an engine control unit for controlling the engine. The engine control unit and the motor control unit 150 may be controlled by a higher-level controller. In addition, the engine control unit and the motor control unit may be integrated into a single controller.

Also, driving torque from the engine and the motor may be transmitted to driving wheels via a transmission 160.

Meanwhile, as shown in FIG. 1, the control system of the present disclosure may be configured to include a non-uniform displacement engine including a plurality of at least two kinds or sizes of cylinders having different displacements.

The non-uniform displacement engine is characterized by different displacements for respective cylinders, and selects the merits and demerits of high displacement and low displacement based on a controllable strategy in order to improve fuel efficiency and power performance. In addition, according to the present disclosure, which is configured as a system assisted by the motor, it is possible to compensate for the characteristics of each cylinder utilizing the motor. Moreover, it is possible to improve driving efficiency and to optimize energy efficiency through energy recovery. In particular, unlike the related art in which excessive mechanical energy is used in order to ensure stable idling, it is possible to ensure stable idling utilizing the electrical energy of the motor. In addition, it is possible to mitigate vibration and noise utilizing the motor.

For example, as shown in FIG. 1, the non-uniform displacement engine may be configured to have a four-cylinder structure including two cylinders of one kind or size having the same displacement and two cylinders of the other kind or size having the same displacement.

The non-uniform displacement may be set based on the characteristics of the system. The cylinders are symmetrically arranged in ignition (explosion) order such that a vibration component caused by the difference in displacement can be offset partially or entirely.

That is, in explosion order 1-3-4-2 or 1-2-4-3, cylinders located at corresponding positions, i.e. the first and fourth cylinders and the second and third cylinders may have the same displacement, and the other cylinder group may have different displacements.

For example, the first and fourth cylinders may have high displacement, and the second and third cylinders may have lower displacement than the first and fourth cylinders. This case is shown in FIG. 1.

According to this cylinder arrangement, it is possible to offset a vibration component based on the arrangement of the cylinders at corresponding positions, thereby improving vibration and noise characteristics.

In a case in which the engine is configured as a four-cylinder engine having a total displacement of 1.5 L according to a first embodiment, the first and fourth cylinders may have a relatively high displacement of 0.4 L for each of the two cylinders, and the second and third cylinders may have a relatively low displacement of 0.35 L for each of the two cylinders.

According to the first embodiment, the four-cylinder engine may be ignited in the order 1-3-4-2, and cylinders having different displacements may be arranged so as to correspond to the opposite cylinders in the ignition order, in order to offset a vibration component which may be caused due to the non-uniform displacement.

Figure 2:
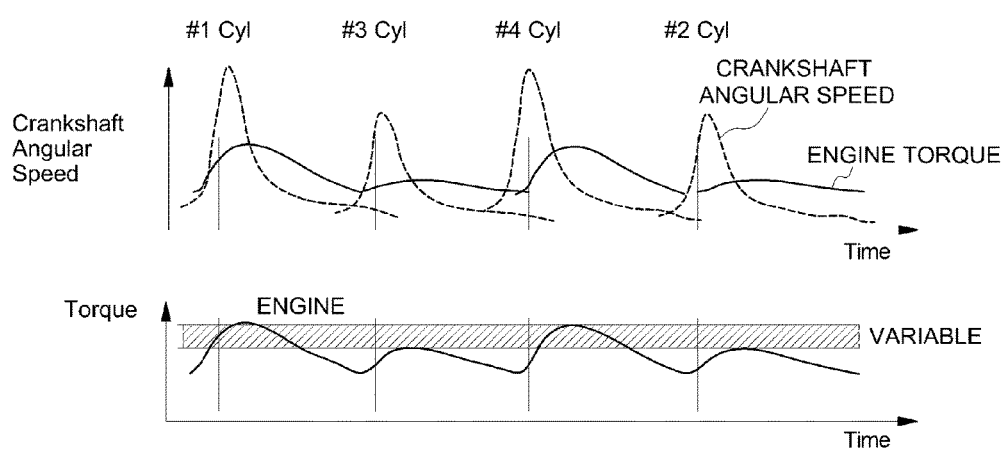
FIG. 2 is a graph showing dynamic characteristics of a non-uniform displacement engine according to embodiments of the present disclosure.

Meanwhile, FIG. 2 is a graph showing dynamic characteristics of a non-uniform displacement engine according to the first embodiment.

As shown in FIG. 2, the first and fourth cylinders, which are high displacement cylinders, have higher torque and crankshaft angular speed, which are generated as a result of explosions, than the second and third cylinders. That is, referring to the crankshaft angular speed and the engine torque in the explosion (or power) stroke of each cylinder, the high displacement cylinders have higher crankshaft angular speeds and engine torques than do the lower displacement cylinders.

The explosion stroke of each cylinder means a period set based on the same criterion, such as crank angles before and after the explosion of each cylinder or the distance from a top dead center (TDC) to the upper end of a piston, which is set.

The difference in displacement among the cylinders causes non-uniform driving of the engine, resulting in vibration and noise.

Meanwhile, an embodiment of the present disclosure includes motor control for compensating for non-uniform engine driving characteristics.

Figure 3:
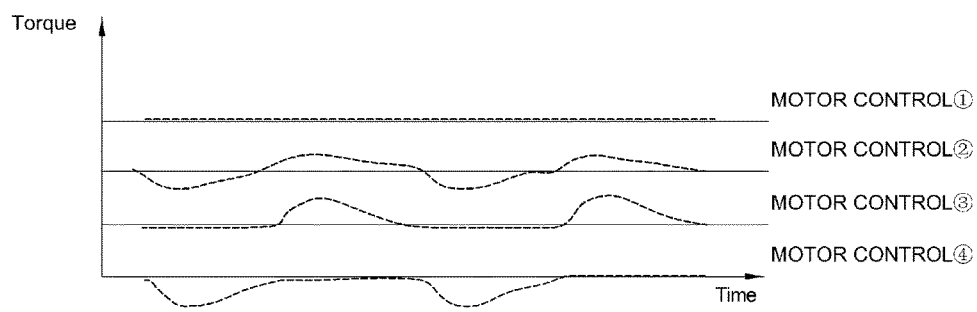
FIG. 3 is a view showing motor torque control that assists torque output from a non-uniform displacement engine according to embodiments of the present disclosure.

FIG. 3 shows examples of such motor control. Specifically, FIG. 3 shows examples of motor torque control assisting torque output from the non-uniform displacement engine. In addition, FIGS. 4A to 4D respectively show motor control methods according to motor control modes ① to ④ shown in FIG. 3.

FIG. 3 shows motor control modes ① to ④. In motor control mode ①, the motor is not driven, or the motor is controlled to generate uniform driving torque. In motor control modes ② to ④, the motor is controlled differently in respective explosion strokes of the non-uniform displacement engine.

Figure 4A:
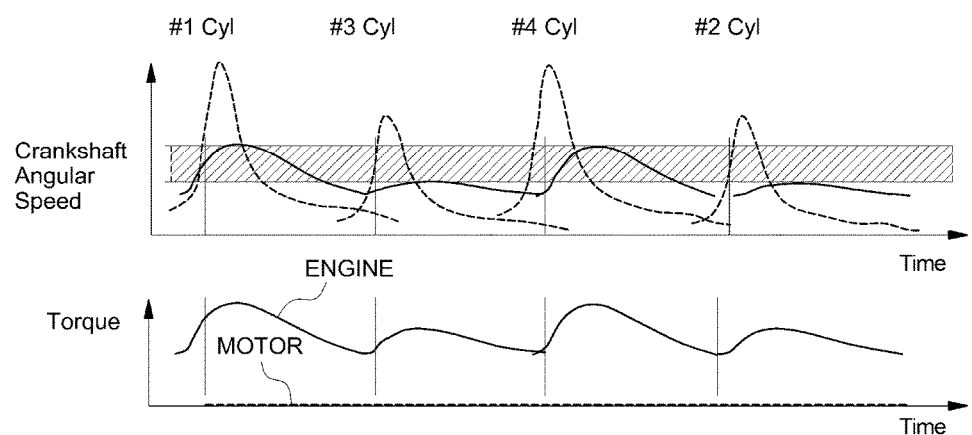
FIGS. 4A to 4D are graphs showing a control method of a motor-assisted non-uniform displacement engine control system according to embodiments of the present disclosure.

Particularly, in motor control mode ①, as shown in FIG. 4A, the motor is not driven, or the motor is controlled to generate uniform driving torque. Since pulsation components of the high displacement cylinders and the lower displacement cylinders are utilized, the unique driving characteristics of the non-uniform displacement engine remain unchanged (the crankshaft angular speed is not changed).

Consequently, it is possible to improve driving efficiency and fuel efficiency at a high efficiency point utilizing the increments in kinetic energy of the high displacement cylinders and to improve responsiveness in a transition state and power performance utilizing the increase in potential energy.

Meanwhile, in motor control modes ② to ④, the motor is controlled differently in respective explosion strokes of the non-uniform displacement engine. In motor control mode ②, power assistance and energy regeneration are proportionally controlled in order to minimize a vibration component. Motor control mode ③ is used for traveling at the maximum power, and motor control mode ④ is used for traveling at the minimum power.

That is, in motor control modes ② to ④, the motor is selectively controlled by the motor control unit. The motor control may be performed in order to compensate for the difference in torque due to the different displacements of the cylinders. In the explosion stroke of each cylinder, therefore, the motor may be controlled such that the sum of the engine torque and the motor torque is uniform using driving or energy regeneration of the motor. Motor control modes ② to ④ are respectively shown in FIGS. 4B to 4D. In each torque graph, the solid line indicates engine torque, and the dotted line indicates motor torque. In addition, it can be seen from a comparison with FIG. 4A that it is possible to obtain uniform crankshaft angular speed through power assistance or energy regeneration by the motor.

Figure 4B:
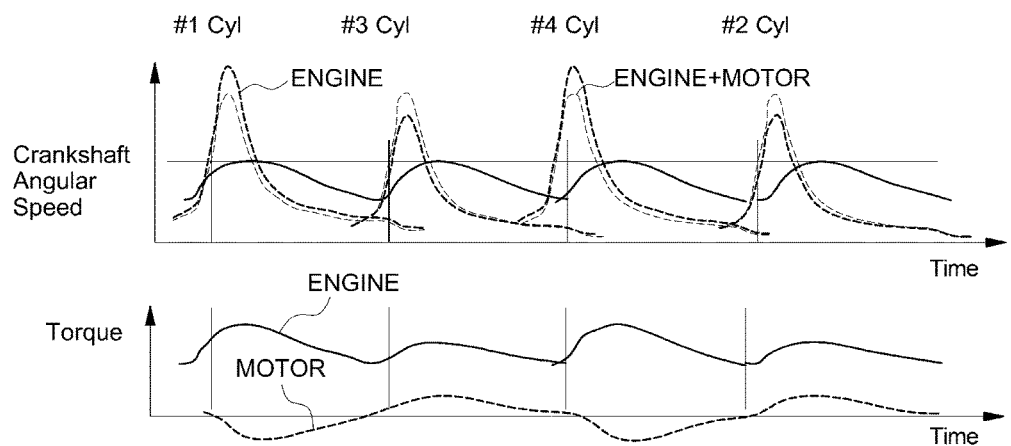

Specifically, in motor control mode ②, a target displacement is set, and the driving torque of the engine and the motor is set based on the target displacement, such that the motor has uniform output characteristics in all explosion strokes. As shown in FIG. 4B, the motor is controlled such that negative torque is generated through energy regeneration of the motor in the explosion strokes of the high displacement cylinders, and the motor is controlled such that positive torque is generated by the motor to achieve power assistance in the explosion strokes of the low displacement cylinders. The motor is controlled to have uniform output characteristics in the respective explosion strokes, whereby it is possible to minimize a vibration component of the non-uniform displacement engine.

Figure 4C:
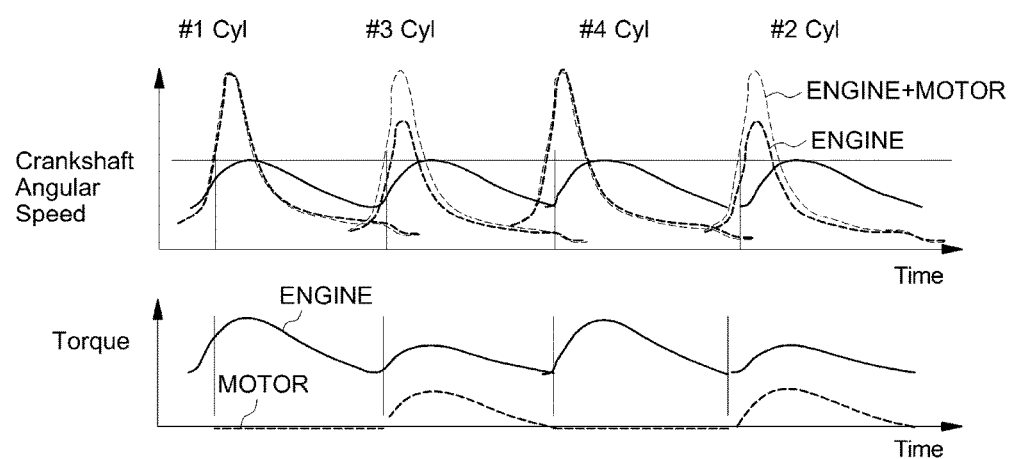

Motor control mode ③ is used for traveling at the maximum power of the non-uniform displacement engine. The motor is controlled such that the low displacement cylinders are assisted by the motor to achieve the maximum power of the given non-uniform displacement. In motor control mode ③, the motor may be controlled such that the same power performance as in the explosion strokes of the high displacement cylinders is performed in the explosion strokes of the low displacement cylinders through power assistance by the motor. As shown in FIG. 4C, therefore, the motor is controlled such that power assistance by the motor is not achieved in the explosion strokes of the high displacement cylinders and such that traveling is performed at the maximum power as in the explosion strokes of the high displacement cylinders through power assistance by the motor only in the explosion strokes of the low displacement cylinders.

Figure 4D:
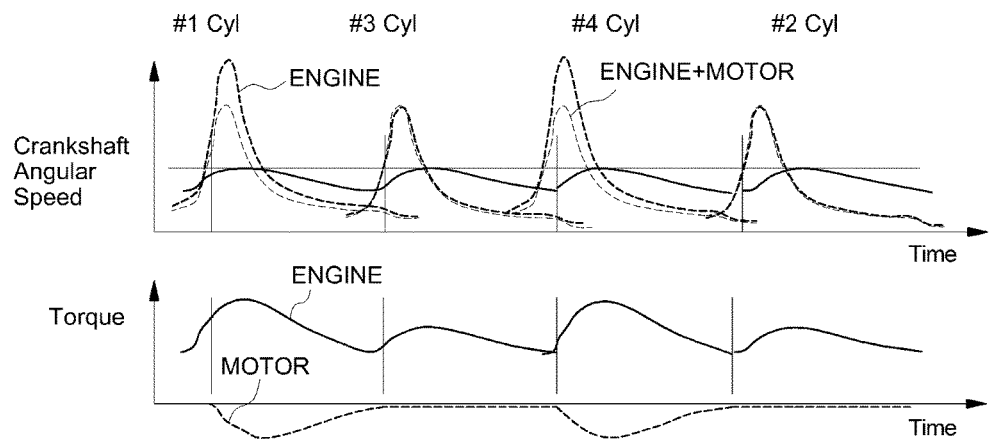

Meanwhile, motor control mode ④ is used for traveling at the minimum power of the non-uniform displacement engine. The motor is controlled such that excessive energy from the high displacement cylinders is recovered by the motor to achieve the minimum power of the given non-uniform displacement. In motor control mode ④, as shown in FIG. 4D, the motor is controlled such that power assistance by the motor is not achieved in the explosion strokes of the low displacement cylinders and such that negative torque is generated by energy regeneration in the explosion strokes of the high displacement cylinders, reversely to motor control mode ③. Particularly, in motor control mode ④, the motor is controlled based on the minimum power of the low displacement cylinders. Consequently, the motor is operated at uniform minimum power based on the low displacement cylinders.

Motor control modes ① to ④ may be selectively used by the motor control unit. For example, the motor control unit may store motor control modes ② to ④, which are different from one another, and may select any one of the motor control modes to control the motor.

In an embodiment of the present disclosure, it is possible to variably configure the substantial driving characteristics of the vehicle according to the utilization of the motor based on the high displacement and the low displacement of the non-uniform displacement engine. In particular, it is possible to elaborately perform variable displacement control within a set range of displacement through the use of the motor control modes.

Figure 5A:
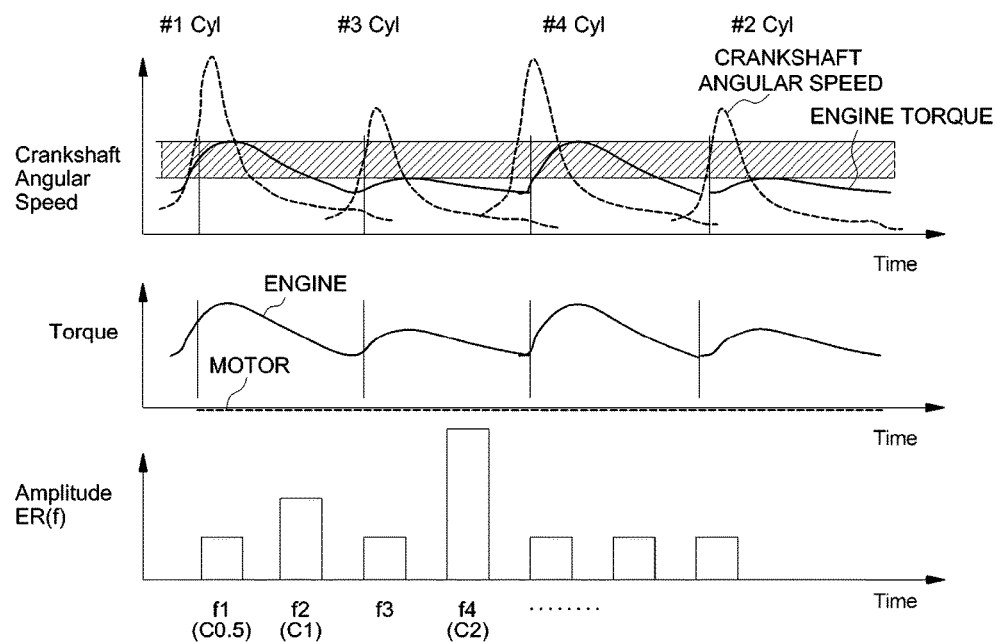
FIGS. 5A and 5B are graphs respectively showing normal control and compensation control modes of a non-uniform displacement engine control system in a frequency domain according to embodiments of the present disclosure.
Figure 5B:
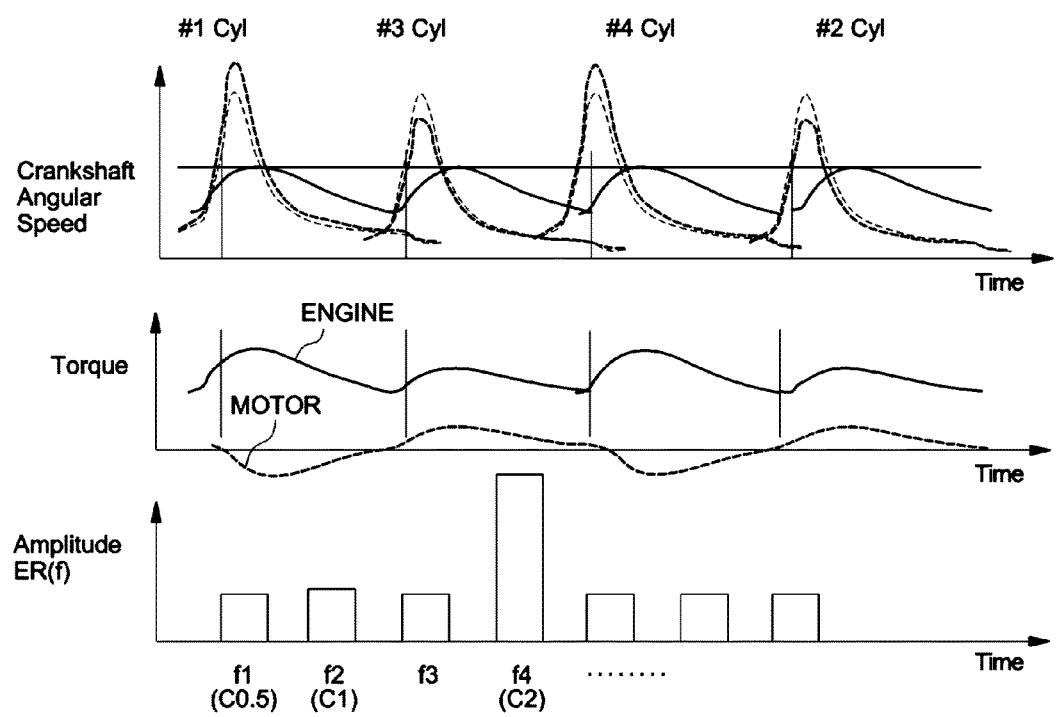

FIGS. 5A and 5B are graphs respectively showing normal control and compensation control modes of a non-uniform displacement engine control system in a frequency domain, particularly showing an improvement in the vibration characteristics. That is, in an example of FIG. 5A, a C1 component of the frequency domain is large, and, in an example of FIG. 5B, the C1 component of the frequency domain is greatly reduced through the use of control modes ② to ④, thereby greatly reducing vibration and noise.

Meanwhile, in an embodiment of the present disclosure, the motor control unit has an additional control mode for controlling the motor at the time of rapid acceleration or at the time of rapid deceleration.

When rapid acceleration or rapid deceleration is performed according to the driver's intention, the state of the vehicle is abruptly changed. In this specification, this state is referred to as a transient state, and the mode in which the motor is controlled at the time of rapid acceleration or at the time of rapid deceleration is referred to as a transient state control mode.

The transient state may be determined by determining whether rapid acceleration has been performed or rapid deceleration has been performed. When determining whether rapid acceleration has been performed or rapid deceleration has been performed, information about driver-requested deceleration or acceleration determined by referring to an accelerator pedal input or a brake pedal input may be used. Alternatively, information about actual deceleration or acceleration of the vehicle detected by a sensor may be used directly. Consequently, whether rapid acceleration has been performed or rapid deceleration has been performed may be determined by determining whether a requested acceleration (actual acceleration) value or a request deceleration (actual deceleration) value exceeds a predetermined first reference value. The first reference value is a value used to determine whether rapid acceleration has been performed or rapid deceleration has been performed. The first reference value may include a first acceleration reference value $T_{a1}$, which is used to determine whether rapid acceleration has been performed, and a first deceleration reference value $T_{d1}$, which is used to determine whether rapid deceleration has been performed. However, the determination as to whether rapid acceleration has been performed or rapid deceleration has been performed is not limited to the illustrated example. Whether rapid acceleration has been performed or rapid deceleration has been performed may be determined in various manners using information related to the driver's intention or acceleration or deceleration of the vehicle. Consequently, methods of determining whether rapid acceleration has been performed or rapid deceleration has been performed may be applied without limitation.

The transient state control mode according to this embodiment of the present disclosure is characterized in that offset torque is additionally applied, in addition to the engine torque and the motor torque in the control modes described above.

That is, on the assumption that the torque determined in the predetermined control modes is base torque, offset torque is additionally applied to the base torque. The offset torque comprises the increase or decrease of the motor torque based on an acceleration or deceleration state. When the vehicle rapidly accelerates, therefore, the motor torque is added, whereby power assistance is performed. When the vehicle rapidly decelerates, the motor regeneration is increased, whereby the deceleration performance of the vehicle is improved.

Figure 6A:
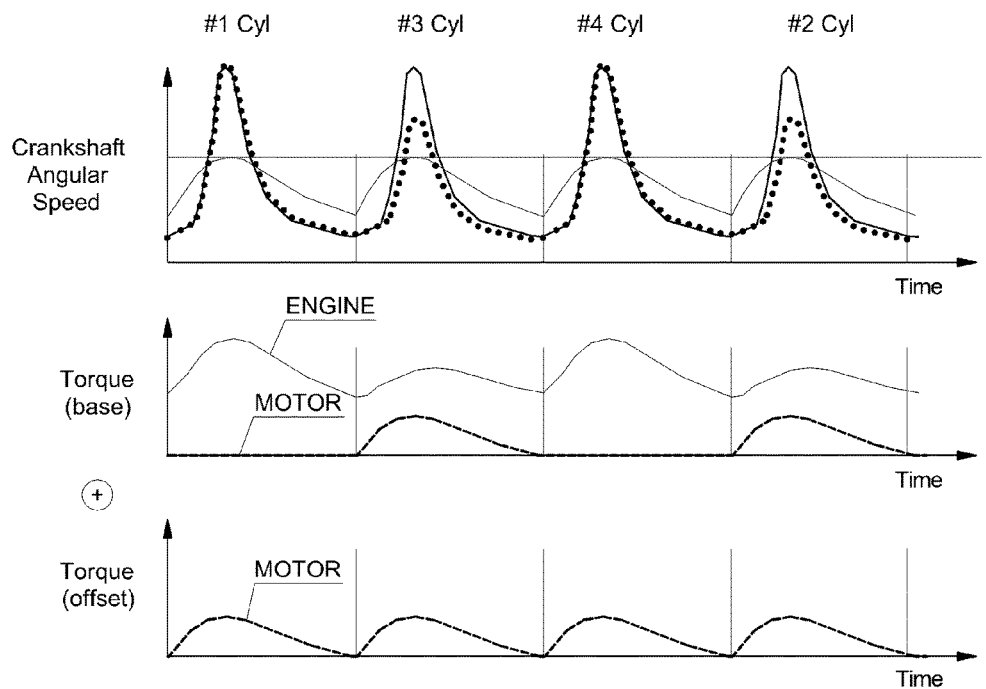
FIG. 6A is a graph showing base torque and offset torque at the time of rapid acceleration according to an embodiment of the present disclosure.
Figure 6B:
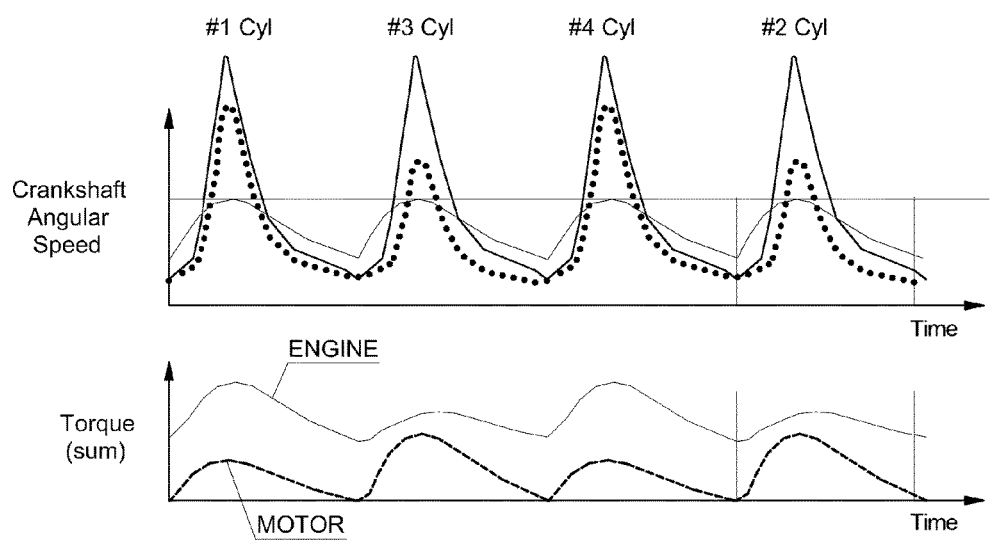
FIG. 6B is a graph showing a control mode to which both the base torque and the offset torque of FIG. 6A are applied according to embodiments of the present disclosure.
Figure 7:
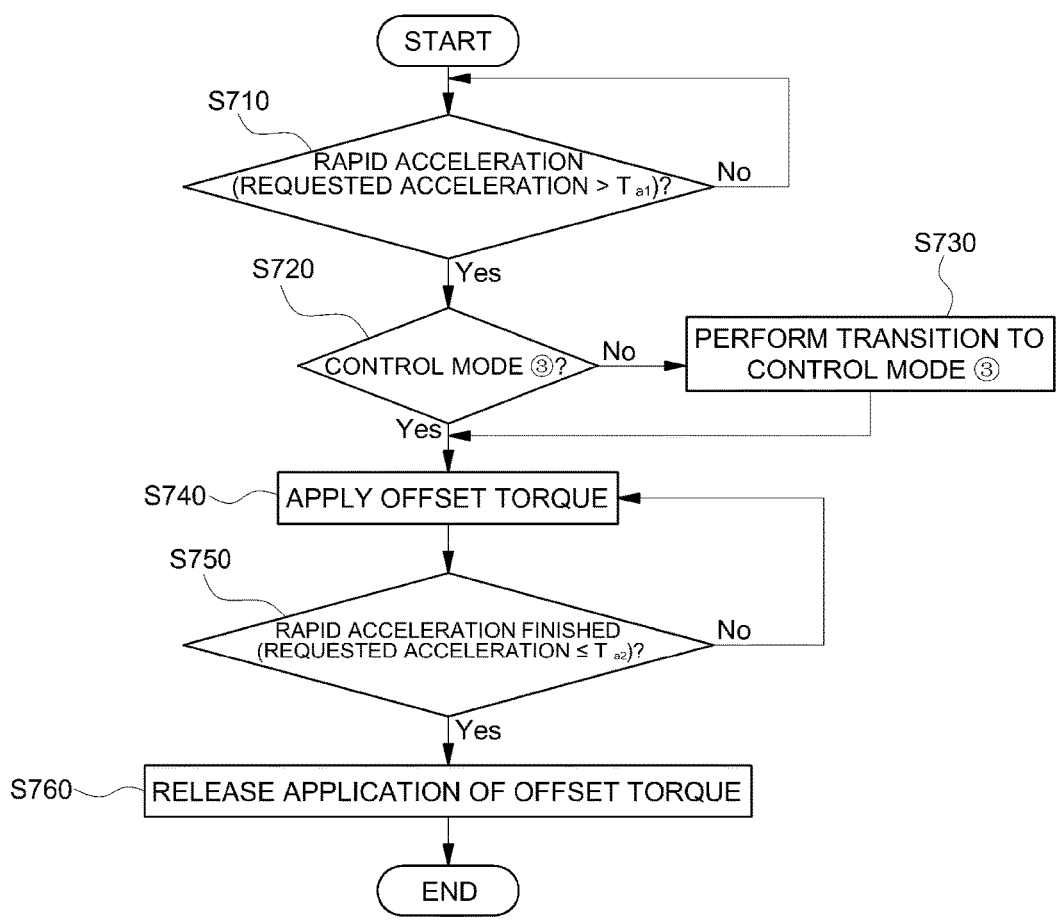
FIG. 7 is a flowchart showing a method of controlling a non-uniform displacement engine control system at a time of rapid acceleration according to an embodiment of the present disclosure.
Figure 8A:
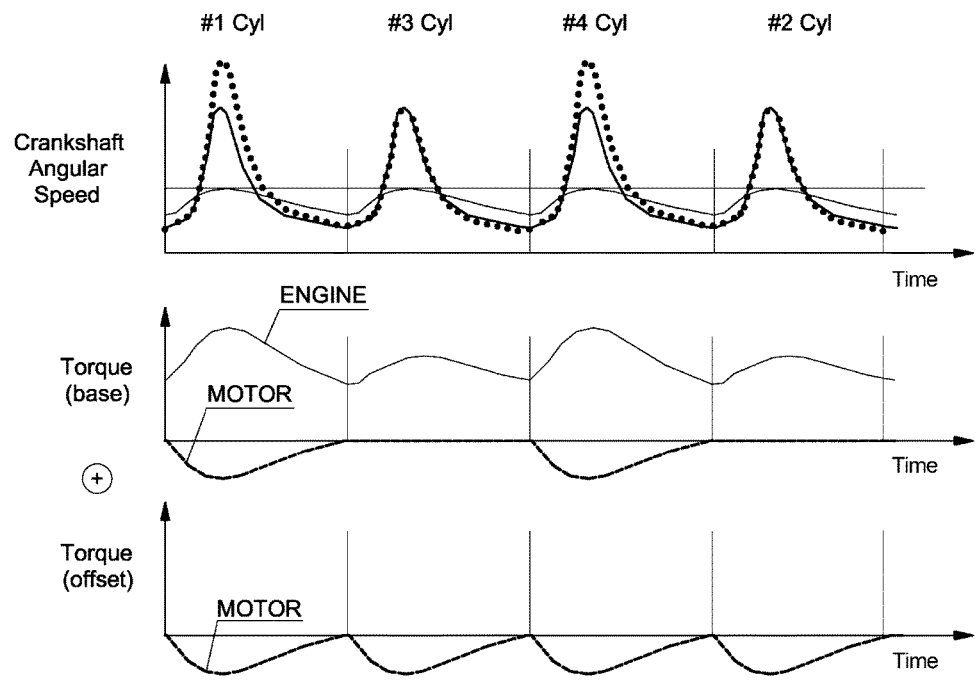
FIG. 8A is a graph showing base torque and offset torque at a time of rapid deceleration according to an embodiment of the present disclosure.
Figure 8B:
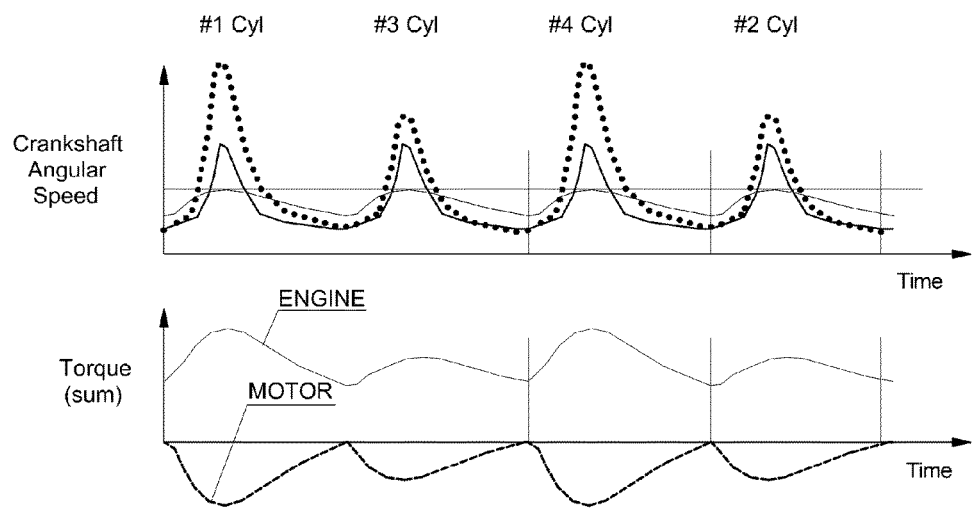
FIG. 8B is a graph showing a control mode to which both the base torque and the offset torque of FIG. 8A are applied according to embodiments of the present disclosure.
Figure 9:
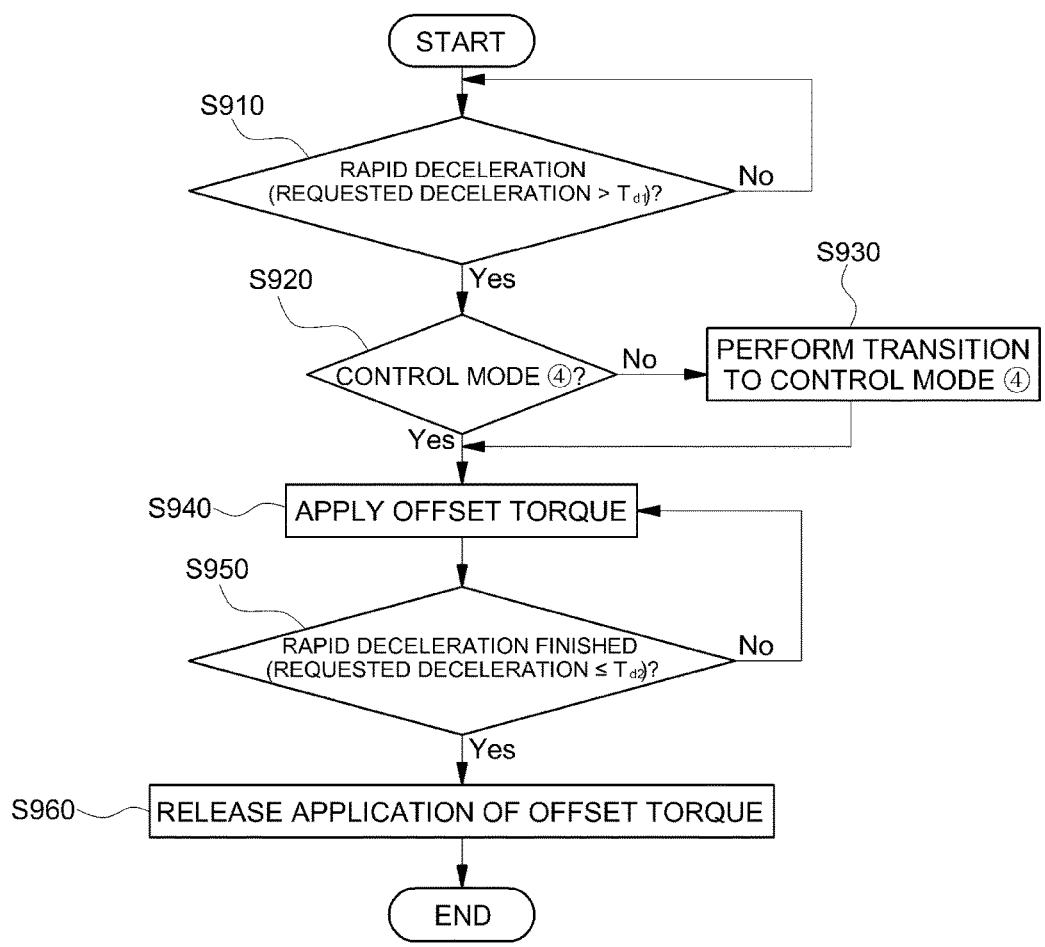
FIG. 9 is a flowchart showing a method of controlling a non-uniform displacement engine control system at a time of rapid deceleration according to an embodiment of the present disclosure.

FIGS. 6A and 6B illustrate control at a time of rapid acceleration in the transient state control mode, and FIG. 7 is a flowchart showing a control process at the time of rapid acceleration. FIGS. 8A and 8B illustrate control at the time of rapid deceleration in the transient state control mode, and FIG. 9 is a flowchart showing a control process at the time of rapid deceleration.

First, the transient state control mode at the time of rapid acceleration will be described with reference to FIGS. 6A, 6B and 7.

In this embodiment, the motor control unit or a higher-level controller determines whether rapid acceleration (or rapid deceleration) has been performed. Upon determining that rapid acceleration (or rapid deceleration) has been performed, offset torque may be additionally applied by the motor control unit or the higher-level controller.

Specifically, the transient state control mode is applied at the time of rapid acceleration (or rapid deceleration). As shown in FIG. 7, the motor control unit determines whether rapid acceleration has been performed (S710).

In this embodiment, as shown in FIG. 6A, since the maximum power performance is required at the time of rapid acceleration, control is performed in control mode ③. FIG. 6A shows the case in which the vehicle is traveling in control mode ③. However, the present disclosure is not limited thereto. Upon determining that rapid acceleration has been performed, as shown in FIG. 7, it is determined whether the current control mode is control mode ③ (S720). Upon determining that the current control mode is not control mode a, a process for performing transition to control mode ③ may follow (S730).

In addition, in the transient state control mode at the time of rapid acceleration, positive offset torque is applied in order to additionally assist the motor torque (S740).

The upper graph of FIG. 6A shows that crankshaft angular speed and torque in control mode ③ are output so as to have a uniform profile for each of the explosion strokes of the cylinders. The middle graph of FIG. 6A shows engine torque and motor torque as base torque in control mode ③. The lower graph of FIG. 6A shows offset torque that is applied at the time of rapid acceleration. The offset torque that is applied at the time of rapid acceleration may be set in consideration of the maximum torque of the motor. At this time, the offset torque may be set to have a curve shown in FIG. 6A in consideration of the increase and decrease of torque based on the explosion of the engine.

FIG. 6B shows the state in which the base torque and the offset torque shown in FIG. 6A are applied together. Specifically, FIG. 6B shows a first transient state control mode at the time of rapid acceleration.

In the first transient state control mode, motor torque having offset torque applied thereto is added to engine torque of the non-uniform displacement engine's own. That is, as shown in the graph of FIG. 6B, torque obtained by adding offset torque to motor torque in control mode ③ is determined as torque that is added by the motor. In the first transient state control mode, therefore, power performance required for rapid acceleration may be provided.

Meanwhile, FIGS. 8A, 8B and 9 show a transient state control mode at the time of rapid deceleration. In the transient state control mode according to this embodiment, as shown in FIGS. 8A and 9, it is determined whether rapid deceleration has been performed (S910). At the time of rapid deceleration, control is performed so as to maximize energy regeneration. Consequently, control is performed in control mode ④, in which energy regeneration is performed in explosion stroke of the high displacement cylinders while the minimum power is provided. In the same manner as described above, FIG. 8A shows the case in which the vehicle is traveling in control mode ④.

However, the present disclosure is not limited thereto. It is determined whether the current control mode is control mode ④ (S920). Upon determining that the current control mode is not control mode ④, a process for performing a transition to control mode ④ may follow (S930).

In addition, negative offset torque may be applied in order to maximize energy regeneration (S940).

The upper graph of FIG. 8A shows that crankshaft angular speed and torque in control mode ④ are output so as to have a uniform profile for each of the explosion strokes of the cylinders. The middle graph of FIG. 8A shows engine torque and motor torque as base torque in control mode ④. The lower graph of FIG. 8A shows offset torque that is applied at the time of rapid deceleration. The offset torque that is applied at the time of rapid deceleration may be set in consideration of the maximum amount of energy that can be regenerated. At this time, the offset torque may be set to have a curve shown in FIG. 8A in consideration of the increase and decrease of torque based on the explosion of the engine.

FIG. 8B shows the state in which the base torque and the offset torque shown in FIG. 8A are applied together. Specifically, FIG. 8B shows a second transient state control mode at the time of rapid deceleration.

In the second transient state control mode, motor torque having offset torque applied thereto is added to engine torque of the non-uniform displacement engine's own. That is, as shown in the graph of FIG. 8B, torque obtained by adding offset torque to motor torque in control mode ④ is determined as energy regeneration torque. In the second transient state control mode, therefore, sufficient energy regeneration may be achieved at the time of rapid deceleration The first or second transient state control mode is temporarily applied when a specific event, such as rapid acceleration or rapid deceleration, occurs. When the rapid acceleration or rapid deceleration is finished and the behavior of the vehicle returns to the normal state, the transient state control mode is finished. For example, in the transient state control mode according to this embodiment, it is determined that rapid acceleration or rapid deceleration is finished when requested acceleration or deceleration or actual acceleration or deceleration of the vehicle is equal to or less than a predetermined second reference value (S750 or S950), and the transient state control mode is finished in order to prevent the additional application of offset torque (S760 or S960).

The second reference value is a value used to determine whether rapid acceleration is finished or rapid deceleration is finished. The second reference value may include a second acceleration reference value $T_{a2}$, which is used to determine whether rapid acceleration is finished, and a second deceleration reference value $T_{d2}$, which is used to determine whether rapid deceleration is finished.

Methods of determining whether rapid acceleration or rapid deceleration is finished are not limited to the illustrated example. Whether rapid acceleration is finished or rapid deceleration is finished may be determined in various manners. Consequently, the determination as to whether rapid acceleration or rapid deceleration is finished may be applied based on predetermined criteria without limitations.

FIGS. 7 and 9 show examples of determining whether rapid acceleration or rapid deceleration is finished in order to release the application of the offset torque. In other embodiments of the present disclosure, the time during which the offset torque is applied may be set without determining whether rapid acceleration or rapid deceleration is finished. That is, since the offset torque is temporarily applied in a transient state period, the time during which the offset torque is applied may be set in advance. When the predetermined time has elapsed after the offset torque is applied, the motor control unit may release the application of the offset torque such that the motor is controlled based on base torque set for each control mode.

According to a method of controlling the non-uniform displacement engine control system including the first and second transient state control modes described above, it is possible to sufficiently suppress vibration and noise caused by the non-uniform displacement engine, to secure excellent power performance at the time of rapid acceleration, and to maximize energy regeneration at the time of rapid deceleration, thereby improving travelling performance and fuel efficiency.

As is apparent from the above description, an embodiment of the present disclosure may be used as a variable displacement engine and a control system in a vehicle using an engine and a motor as a power source, as in a hybrid vehicle.

In addition, in an embodiment of the present disclosure, modes based on traveling conditions may be selectively embodied. Consequently, it is possible to variously perform control in operation zones, such as the exhibition of power performance or the optimization of fuel efficiency, as described.

In addition, in an embodiment of the present disclosure, it is possible to increase freedom in the control of the hybrid vehicle, thereby proposing a new paradigm to control the operation of the hybrid vehicle.

In particular, according to the present disclosure, it is possible to configure a driving system such that variable displacement control is elaborately or variously performed through the use of the motor within a set variable range.

In addition, it is possible to entirely or partially solve vibration and noise problems caused by the non-uniform displacement engine, thereby improving travelling efficiency.

In addition, in an embodiment of the present disclosure, the control system and method are specialized for the non-uniform displacement engine system. At the time of rapid acceleration, therefore, positive offset torque is applied in order to secure sufficient acceleration performance. In addition, at the time of rapid deceleration, negative offset torque is applied in order to maximize energy regeneration.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A non-uniform displacement engine control system having a transient state control mode comprising:
   a non-uniform displacement engine including a plurality of cylinders, the cylinders including at least two sizes of cylinders having different displacements;
   a motor connected to a driving shaft of the engine;
   a battery for supplying electrical energy to the motor; and
   a motor control unit for controlling the motor,
   wherein the motor control unit controls the motor such that a sum of an engine torque and a motor torque in explosion strokes of each cylinder is uniform by compensating for a difference in torque caused by the cylinders having different displacements,
   wherein the motor control unit has at least two control modes, each of which having a different driving torque by adjusting the motor torque in accordance with the engine torque such that the driving torque for each of the at least control modes varies by changing the at least two control modes,
   wherein the motor torque is predetermined to compensate the torque difference due to the different displacements of the cylinders and stored in the motor control unit, and
   wherein the motor control unit has the transient state control mode for additionally applying an offset torque to the predetermined motor torque at a time of rapid acceleration or rapid deceleration.

2. The non-uniform displacement engine control system of claim 1, wherein the motor control unit determines that rapid deceleration is performed when driver-requested deceleration exceeds a predetermined first deceleration reference value and determines that rapid acceleration is performed when driver-requested acceleration exceeds a predetermined first acceleration reference value.

3. The non-uniform displacement engine control system of claim 1, wherein the motor control unit determines that rapid deceleration is performed when actual deceleration of a vehicle exceeds a predetermined first deceleration reference value and determines that rapid acceleration is performed when actual acceleration of the vehicle exceeds a predetermined first acceleration reference value.

4. The non-uniform displacement engine control system of claim 1, wherein
   the non-uniform displacement engine comprises two sizes of cylinders having different displacements,
   the motor control unit has a first mode for controlling the motor such that the motor is not driven in an explosion stroke of a high displacement cylinder and power assistance is performed by the motor torque in an explosion stroke of a low displacement cylinder, and
   upon determining that the rapid acceleration is performed, the motor control unit controls the motor in the first mode.

5. The non-uniform displacement engine control system of claim 4, wherein the offset torque applied at the time of rapid acceleration is positive torque.

6. The non-uniform displacement engine control system of claim 4, wherein the motor control unit determines whether the rapid acceleration is finished based on requested acceleration information or actual acceleration information and, upon determining that the rapid acceleration is finished, controls the motor such that application of the offset torque is released.

7. The non-uniform displacement engine control system of claim 1, wherein
   the non-uniform displacement engine comprises two sizes of cylinders having different displacements,
   the motor control unit has a second mode for controlling the motor such that energy regeneration is performed in an explosion stroke of a high displacement cylinder and the motor is not driven in an explosion stroke of a low displacement cylinder, and
   upon determining that the rapid deceleration is performed, the motor control unit controls the motor in the second mode.

8. The non-uniform displacement engine control system of claim 7, wherein the offset torque applied at the time of rapid deceleration is negative torque.

9. The non-uniform displacement engine control system of claim 7, wherein the motor control unit determines whether the rapid deceleration is finished based on requested deceleration information or actual deceleration information and, upon determining that the rapid deceleration is finished, controls the motor such that application of the offset torque is released.

10. The non-uniform displacement engine control system of claim 1, wherein the non-uniform displacement engine comprises two sets of cylinders, each set of cylinders comprising at least two cylinders having the same displacement.

11. The non-uniform displacement engine control system of claim 10, wherein the non-uniform displacement engine comprises a first cylinder and a fourth cylinder having a higher displacement than a second cylinder and a third cylinder, and each set of cylinders alternately performs an explosion stroke.

12. A control method of a system including a non-uniform displacement engine including a plurality of cylinders, the cylinders including at least two sizes of cylinders having different displacements; a motor connected to a driving shaft of the engine; and a motor control unit for controlling the motor, the control method comprising:

driving the non-uniform displacement engine;

determining a motor torque based on an engine torque; and controlling the motor based on the determined motor torque, wherein at the determining step, the motor control unit controls the motor such that a sum of the engine torque and the motor torque in an explosion stroke of each cylinder is uniform by compensating for a difference in torque caused by the cylinders having different displacements, wherein the motor control unit has at least two control modes, each of which having a different driving torque by adjusting the motor torque in accordance with the engine torque such that the driving torque for each of the at least control modes varies by changing the at least two control modes, wherein the motor torque is predetermined to compensate the torque difference due to the different displacements of the cylinders and stored in the motor control unit, and wherein the motor control unit has the transient state control mode for additionally applying an offset torque to the predetermined motor torque at a time of rapid acceleration or rapid deceleration.

13. The control method of claim 12, wherein the transient state control mode comprises a first transient state control mode for additionally applying a positive offset torque to predetermined motor torque at a time of rapid acceleration and a second transient state control mode for additionally applying a negative offset torque to predetermined motor torque at a time of rapid deceleration.

14. The control method of claim 12, wherein the motor control unit determines that rapid deceleration is performed when driver-requested deceleration or actual deceleration of a vehicle exceeds a predetermined first deceleration reference value and determines that rapid acceleration is performed when driver-requested acceleration or actual acceleration of the vehicle exceeds a predetermined first acceleration reference value.

15. The control method of claim 12, wherein the non-uniform displacement engine comprises two sizes of cylinders having different displacements, the motor control unit has a first mode for controlling the motor such that the motor is not driven in an explosion stroke of a high displacement cylinder and power assistance is performed by the motor torque in an explosion stroke of a low displacement cylinder, and a step of controlling the motor in the transient state control mode comprises determining whether a mode at the time of rapid acceleration is the first mode and, upon determining that the mode at the time of rapid acceleration is not the first mode, performing transition to the first mode before the offset torque is applied.

16. The control method of claim 12, wherein the non-uniform displacement engine comprises two sizes of cylinders having different displacements, the motor control unit has a second mode for controlling the motor such that energy regeneration is performed in an explosion stroke of a high displacement cylinder and the motor is not driven in an explosion stroke of a low displacement cylinder, and a step of controlling the motor in the transient state control mode comprises determining whether a mode at the time of rapid deceleration is the second mode and, upon determining that the mode at the time of rapid deceleration is not the second mode, performing transition to the second mode before the offset torque is applied.

17. The control method of claim 12, wherein the motor control unit determines that rapid deceleration is finished when driver-requested deceleration or actual deceleration of a vehicle is equal to or less than a predetermined second deceleration reference value, determines that rapid acceleration is finished when driver-requested acceleration or actual acceleration of the vehicle is equal to or less than a predetermined second acceleration reference value, and, upon determining that the rapid deceleration is finished or the rapid acceleration is finished, releases application of the offset torque.

* * * * *